United States Patent [19]

de Molina

[11] Patent Number: 5,725,239

[45] Date of Patent: Mar. 10, 1998

[54] ADAPTIVE LOAD DEPENDENT SUSPENSION SYSTEM

[75] Inventor: Simon Anne de Molina, Merchtem, Belgium

[73] Assignee: Monroe Auto Equipment, Monroe, Mich.

[21] Appl. No.: 624,731

[22] Filed: Mar. 26, 1996

[51] Int. Cl.⁶ .............................. B60G 11/27; B60G 17/08
[52] U.S. Cl. .................... 280/711; 280/714; 280/708; 188/299; 188/322.13
[58] Field of Search .................... 280/714, 711, 280/708, 709, 713, 712, 702; 188/299, 322.13; 267/64.15, 64.23, 64.24

[56] References Cited

U.S. PATENT DOCUMENTS

| | | |
|---|---|---|
| 3,954,257 | 5/1976 | Keijzer et al. . |
| 4,017,099 | 4/1977 | Hegel et al. . |
| 4,067,558 | 1/1978 | Keijzer et al. . |
| 4,141,572 | 2/1979 | Sorensen . |
| 4,206,907 | 6/1980 | Harrod . |
| 4,212,484 | 7/1980 | Fujii ........................ 280/707 |
| 4,360,191 | 11/1982 | Urushiyama .............. 267/64.16 |
| 4,396,202 | 8/1983 | Kami et al. ............... 280/840 |
| 4,462,610 | 7/1984 | Saito et al. ............... 280/707 |
| 4,465,288 | 8/1984 | Stone et al. .............. 280/714 |
| 4,729,580 | 3/1988 | Buma et al. .............. 280/707 |
| 4,756,548 | 7/1988 | Kaltenthaler et al. ..... 280/702 |
| 4,802,561 | 2/1989 | Knecht et al. ............ 188/299 |
| 4,890,859 | 1/1990 | Drott ....................... 280/714 |
| 4,974,875 | 12/1990 | Sugasawa et al. ........ 280/772 |
| 4,984,819 | 1/1991 | Kakizaki et al. ......... 280/707 |
| 4,986,568 | 1/1991 | Galtier et al. ............ 280/707 |
| 5,046,755 | 9/1991 | Runkel et al. ............ 280/708 |
| 5,052,712 | 10/1991 | Raidel ...................... 280/711 |
| 5,066,041 | 11/1991 | Kindermann et al. .... 280/772 |
| 5,074,569 | 12/1991 | Kawabata ................. 280/6.12 |
| 5,090,726 | 2/1992 | Nakamura ................ 280/707 |
| 5,092,624 | 3/1992 | Fukuyama et al. ....... 280/707 |
| 5,133,575 | 7/1992 | Zantinge et al. ......... 280/714 |
| 5,154,443 | 10/1992 | Takehara et al. ......... 280/707 |
| 5,261,691 | 11/1993 | Laichinger et al. ...... 280/714 |
| 5,265,913 | 11/1993 | Scheffel .................... 280/840 |
| 5,338,010 | 8/1994 | Haupt ....................... 267/64.16 |
| 5,374,077 | 12/1994 | Penzotti et al. .......... 280/711 |

FOREIGN PATENT DOCUMENTS 3-262718  11/1991  Japan ........................ 280/713

Primary Examiner—Brian L. Johnson
Assistant Examiner—Peter C. English
Attorney, Agent, or Firm—Harness, Dickey & Pierce

[57] ABSTRACT

A suspension system for use in a motor vehicle that is self-adjusting in response to vehicle load and roadway conditions. The system incorporates a pneumatic arrangement for such an adaptive load dependent system which connects air springs with fluid-cushion shock absorbers. The pneumatic arrangement may directly connect the air springs and the shock absorbers to a high pressure circuit that provides a firm ride to the vehicle. Alternatively, the system may be switched to indirectly connect the air springs and the shock absorbers to a low pressure circuit that provides a soft ride. A sensor is provided to sense conditions that operate a control valve to switch between the firm ride and the soft ride choices.

28 Claims, 4 Drawing Sheets

ADAPTIVE LOAD DEPENDENT SUSPENSION SYSTEM

BACKGROUND OF THE INVENTION

1. Field of the Invention

The present invention relates generally to shock absorbers that are responsive to both vehicle load and to roadway conditions. More particularly, the present invention provides a suspension damping system incorporating pneumatic controls which select between a firm damping setting and a soft damping setting as dictated by load and roadway conditions.

2. Description of the Prior Art

In recent years, substantial interest has grown in motor vehicle suspension systems which can offer improved comfort and road holding over the performance offered by conventional passive suspension systems. In general, such improvements are achieved by utilization of an "intelligent" suspension system capable of electronically controlling the suspension forces generated by hydraulic actuators provided at each corner of the motor vehicle.

Suspension systems are provided to filter or "isolate" the vehicle body from vertical road surface irregularities as well as to control body and wheel motion. In addition, it is desirable that the suspension system maintain an average vehicle attitude to promote improved platform stability during maneuvering. The classic passive suspension system includes a spring and a damping device in parallel which are located between the sprung mass (vehicle body) and the unsprung mass (wheel and axles).

Hydraulic actuators, such as shock absorbers and/or struts, are used in conjunction with conventional passive suspension systems to absorb unwanted vibration which occurs during driving. To absorb this unwanted vibration, the hydraulic actuators often include a piston which is located within the actuator and is connected to the body of the automobile through a piston rod. Because the piston is able to limit the flow of damping fluid within the working chamber of the actuator when the actuator is telescopically displaced, the actuator is able to produce a damping force which counteracts the vibration which would otherwise be directly transmitted from the suspension to the vehicle body. The greater the degree to which flow of damping fluid within the working chamber is restricted by the piston, the greater the damping forces which are generated by the actuator.

It is often desirable to have a leveling system which is associated with a shock absorber. Such leveling systems are used to change the height of the shock absorber, rather than to adjust the manner in which road vibration is transferred to the sprung portion of the automobile. In this regard, leveling systems are used to compensate for weight changes associated with the shock absorber which are the result of changes in two types of loading: static loading and dynamic loading. Static loading is simply the static load which is due to the weight associated with the passengers of the automobile, the weight of the cargo in the automobile, and so forth. In contrast, dynamic loading involves the loading which normally varies according to different types of road conditions.

Leveling systems of the type described above may be of varying construction. For example, U.S. Pat. No. 4,141,572 discloses a vehicle leveling system in which sensors are located in a pressurizable chamber and are used to sense the relative position of two movable members which are connected to the sprung and unsprung portions of the automobile, respectively. When the sensors indicate that the movable members are oriented proximate to one position which occurs when the shock absorber is very compressed, air of a relatively high pressure is delivered to the pressurizable chamber causing the shock absorber to elongate. When the sensors indicate that the movable members are oriented proximate to a second position which occurs when the shock absorber is overly extended, air is released from the pressurizable chamber so as to cause the shock absorber to contract. Other recent examples of such suspension systems, both with and without height sensing provisions, include U.S. Pat. Nos. 3,954,257; 4,017,099; 4,067,558; and 4,206,907, the disclosures of which are all incorporated by reference herein.

Another type of vehicle leveling system is described in Lizell, M., "Dynamic Leveling for Ground Vehicles", Doctoral Thesis, Royal Institute of Technology, Stockholm, Sweden. In this reference, a dynamic leveling system for an automobile is described in which the actuator has both variable passive damping capability as well as leveling capability. Using this arrangement, the power consumption of the suspension system is relatively low.

Leveling systems of the type described above generally require the use of a pump for delivering relatively high pressure fluid to the hydraulic actuator. Because these systems have a single pump which delivers damping fluid to each of the shock absorbers, they often have one particular disadvantage. The use of a single pump often requires a fairly extensive hydraulic system which adds both cost and complexity to the leveling system.

SUMMARY OF THE INVENTION

The present invention is directed to a suspension system that is self-adjusting in response to the vehicle load and to roadway conditions. The system incorporates pneumatic controls which select between a firm damping setting and a soft damping setting as dictated by both static loading and dynamic loading.

Accordingly, it is a primary object of the present invention to provide a pneumatic arrangement for an adaptive load dependent suspension system that utilizes air as a fluid to control the ride firmness of the vehicle.

Another object of the present invention is to provide a pneumatic arrangement for an adaptive load dependent suspension system which utilizes the air as a fluid between air springs and the air pressure responsive shock absorbers.

A further object of the present invention is to provide a pneumatic arrangement for an adaptive load dependent suspension system which responds to both static loading and dynamic loading by means of a sensor that drives a control valve to select between the high pressure side and the low pressure side.

Another object of the present invention is to provide such a pneumatic arrangement which permits the system to be relatively low in cost and simple in construction.

Yet another object of the present invention is to provide a pneumatic arrangement for an adaptive load dependent suspension system that optionally incorporates a reservoir with the low pressure side to level out pressure fluctuations.

Still another object of the present invention is to provide a system which is inherently load responsive such that when the load in the vehicle increases, the pressure in the air springs also increases.

BRIEF DESCRIPTION OF THE DRAWINGS

Various advantages of the present invention will become apparent to one skilled in the art on reading the following specification and by reference to the following drawings in which.

DESCRIPTION OF THE PREFERRED EMBODIMENT

Figure 1:
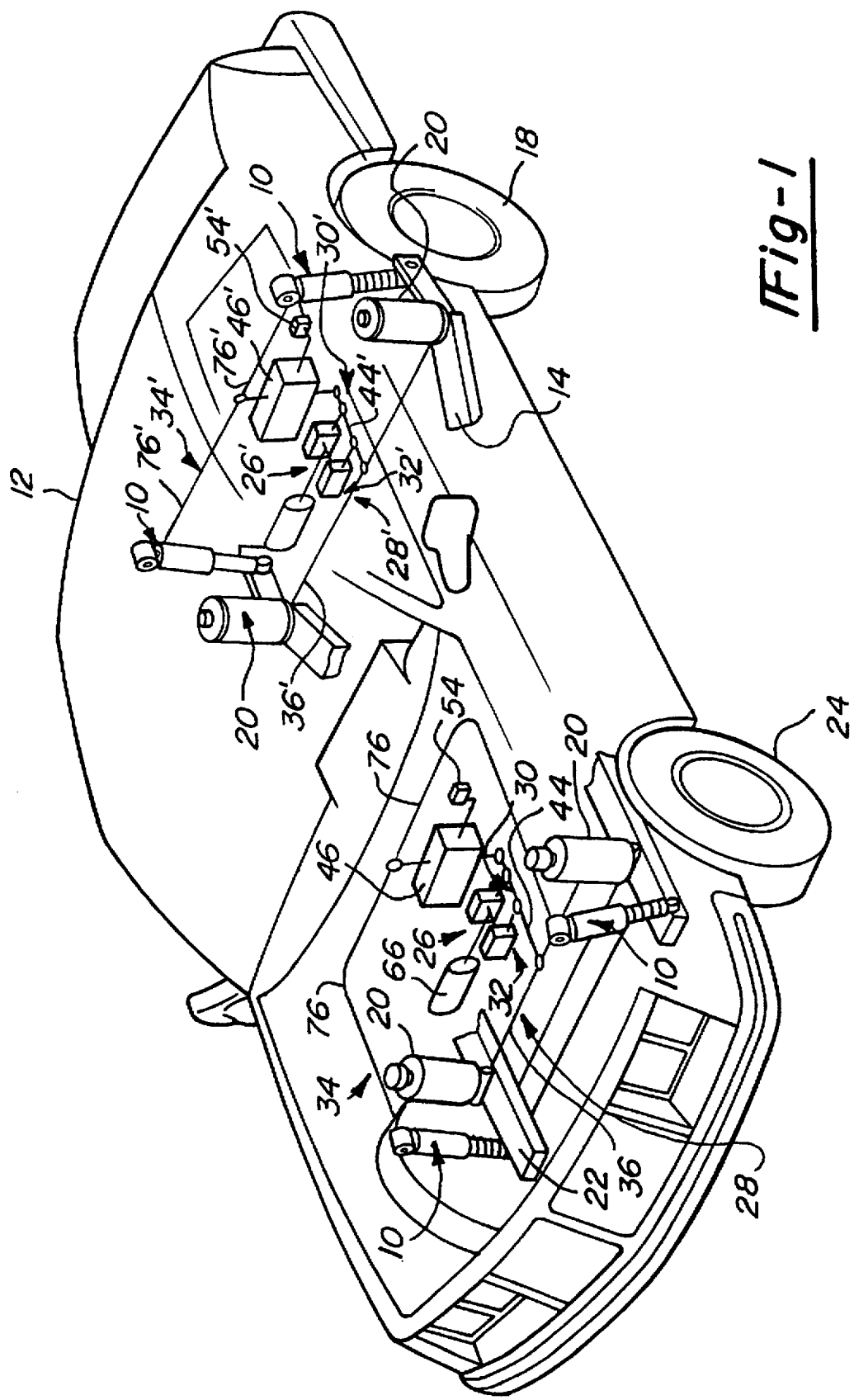
FIG. 1 is an illustration of an automobile using the method and apparatus for providing a pneumatic arrangement for an adaptive load dependent suspension system according to an exemplary preferred embodiment of the present invention.
Figure 2:
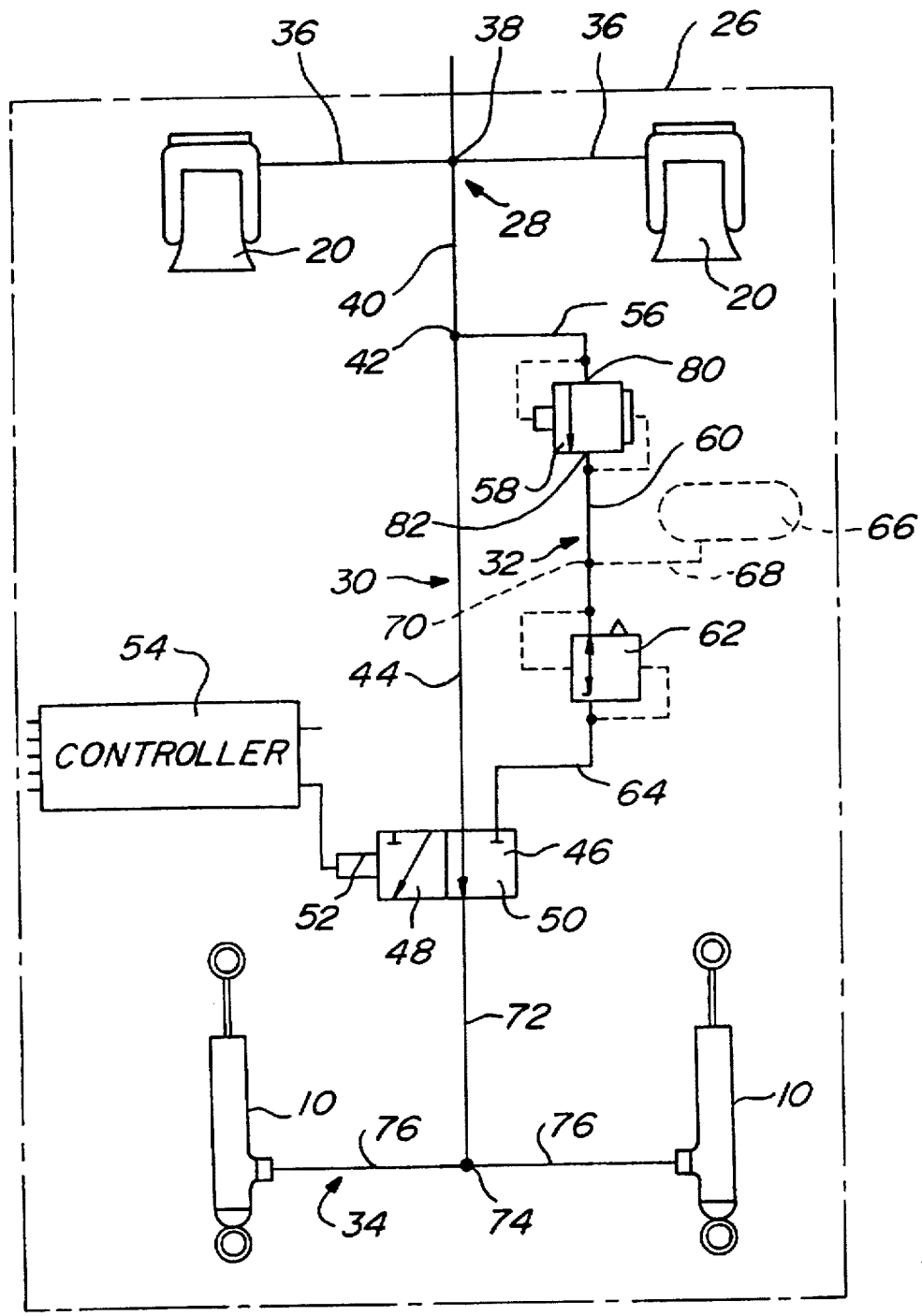
FIG. 2 is a schematic representation of the schematic arrangement for an adaptive load dependent suspension system according to the present invention.

FIGS. 1 and 2 illustrate an exemplary embodiment of a pneumatic arrangement for an adaptive load dependent suspension system according to the present invention, as adapted for providing a damping or cushioning effect between sprung and unsprung portions of the undercarriage of a motor vehicle, or between other interconnected but relatively movable components of other devices. The term "shock absorber" as used herein refers to shock absorbers in the general sense of the phrase and includes MacPherson struts. Although the present invention is depicted in the drawings as being adapted for various automotive applications, one skilled in the art will readily recognize from the following discussion that the principles of the present invention are equally applicable to other types of suspension systems.

Referring to FIG. 1, a perspective view of an automobile having incorporated therein the pneumatic arrangement according to the present invention is illustrated. Specifically, four shock absorbers 10 according to the preferred embodiment of the present invention are shown in operative association with a diagrammatic representation of a conventional automobile 12. The automobile 12 includes a rear suspension system 14 having a transversely extending rear axle assembly (not shown) adapted to operatively support the vehicle's rear wheels 18. The rear axle assembly is operatively connected to the automobile 12 by means of a pair of shock absorbers 10 as well as by the air springs 20. The automobile 12 has a front suspension system 22 including a transversely extending front axle assembly (not shown) to operatively support the vehicle's front wheels 24. The front axle assembly is operatively connected to the automobile 12 by means of a second pair of shock absorbers 10 and by the air springs 20. The shock absorbers 10 serve to damp the relatively movement of the unsprung portion (i.e., the front and rear suspension systems 22 and 14) and the sprung portion (i.e., shown as a body in FIG. 1) of the automobile 12.

It should be understood that reference is made several times to "air springs" and "air-cushioned shock absorbers" throughout this application. However, "air" may be substituted with other gases or with liquid fluids without deviating from the present invention.

The suspension system of the present invention incorporates a pneumatic arrangement that connects the air springs 20 with the air pressure responsive shock absorbers 10. In general, the pneumatic arrangement may directly connect the air springs and the shock absorbers through a high pressure circuit that provides a firm ride to the vehicle.

Alternatively, the system may be switched to indirectly connect the air springs and the shock absorbers through a low pressure circuit that provides a soft ride.

The present adaptive load dependent system according to the present invention incorporates a front pneumatic system, generally illustrated as 26, and a back pneumatic system, generally illustrated as 26'. Each of the front and back pneumatic systems 26 and 26' respectively includes several components, each of which are essentially mirror images of each other. Accordingly, and to avoid unnecessary confusion, generally just one of any two like components of the invention will be discussed with respect to FIG. 1, although both the discussed component as well as its counterpart are shown in the several figures, with the latter being identified by its being primed. It is to be understood that discussion of the one will apply equally to the primed component not discussed. FIG. 2 illustrates the front pneumatic system 26.

The pneumatic system 26 includes an air spring pressure circuit, generally illustrated as 28, a high pressure circuit, generally illustrated as 30, a low pressure circuit, generally illustrated as 32, and a shock absorber pressure circuit, generally illustrated as 34.

The air spring pressure circuit 28 includes a pair of input lines 36 that originate at the air springs 20 and terminate at a juncture 38. A common input line 40 originates at the juncture 38. The common input line terminates at a pressure circuit juncture 42.

The high pressure circuit 30 includes a high pressure line 44 that originates at the juncture 42 and terminates at a discrete control valve 46. The control valve 46 includes a low pressure side 48 and a high pressure side 50. A solenoid 52 operates to drive the control valve 46 to select between the low pressure side 48 and the high pressure side 50 as will be discussed further below. The solenoid 52 operates in response to signals produced by a sensor-controller 54.

The low pressure circuit 32 includes a high pressure input line 56 that originates at the juncture 42 and terminates at a proportional pressure regulator 58. The pressure of the lines 36, 40, 44, and 56 is substantially equal at all times.

A first low pressure line 60 originates at the proportional pressure regulator 58 and terminates at a high pressure regulator 62. A second low pressure line 64 originates at the high pressure regulator 62 and terminates at the discrete control valve 46. An optional pressure reservoir 66 is connected to the first low pressure line 60 via a reservoir connecting line 68 that originates at a reservoir juncture 70.

The shock absorber pressure circuit 34 includes a common pressure output line 72 that originates at the discrete control valve 46 and terminates at a shock absorber pressure circuit juncture 74. A pair of shock absorber pressure lines 76 originate at the circuit juncture 74 and terminate at the shock absorbers 10.

In operation, when driving conditions are relatively uneven as sensed by the sensor-controller 54, the sensor-controller 54 deactivates the discrete control valve 46, thus allowing the discrete control valve 46 to be moved to its high pressure position of the high pressure side 50 which, by connecting the air springs 20 with the shock absorbers 10 by delivering high pressure fluid directly through lines 36, 40, 44, 72 and 76, provides a direct pressure pathway between the air spring pressure circuit 28 and the shock absorber pressure circuit 34.

When the road conditions even out as sensed by the sensor-controller 54, the sensor-controller 54 delivers a signal to the solenoid 52 which causes the discrete control valve 46 to be moved to its low pressure position of the low pressure side 48, whereby the high pressure side 50 is bypassed by high pressure fluid from the air spring pressure circuit 28 being diverted to the low pressure circuit 32. The proportional pressure regulator 58 receives high pressure fluid at an inlet side 80 and exhausts low pressure air from an outlet side 82. The outlet pressure exiting the outlet side 82 is reduced by a fixed ratio with respect to the inlet pressure entering the inlet side 80.

When shifting from the firm to the soft setting, the remaining high pressure in the shock absorber pressure circuit 34 would ordinarily have a direct path back through the discrete control valve 46 to the proportional pressure regulator 58. This remaining high pressure must be relieved. To allow relief, the high pressure regulator 62 is provided between the discrete control valve 46 and the proportional pressure regulator 58. The high pressure regulator 62 lowers the pressure coming from the discrete control valve 46 to a pressure substantially equal to the low pressure of the outlet side 82 of the proportional pressure regulator 58. Optionally, the low pressure circuit is equipped with the pressure reservoir 66 to level out pressure fluctuations.

An important feature of the present invention is that it is inherently load responsive. When the load in the automobile 12 increases, the pressure in the air springs 20 also increases. The relatively low pressure of the low pressure circuit 32 also increases in response to the changes in vehicle load because of operation of the proportional pressure regulator 58.

Figure 3:
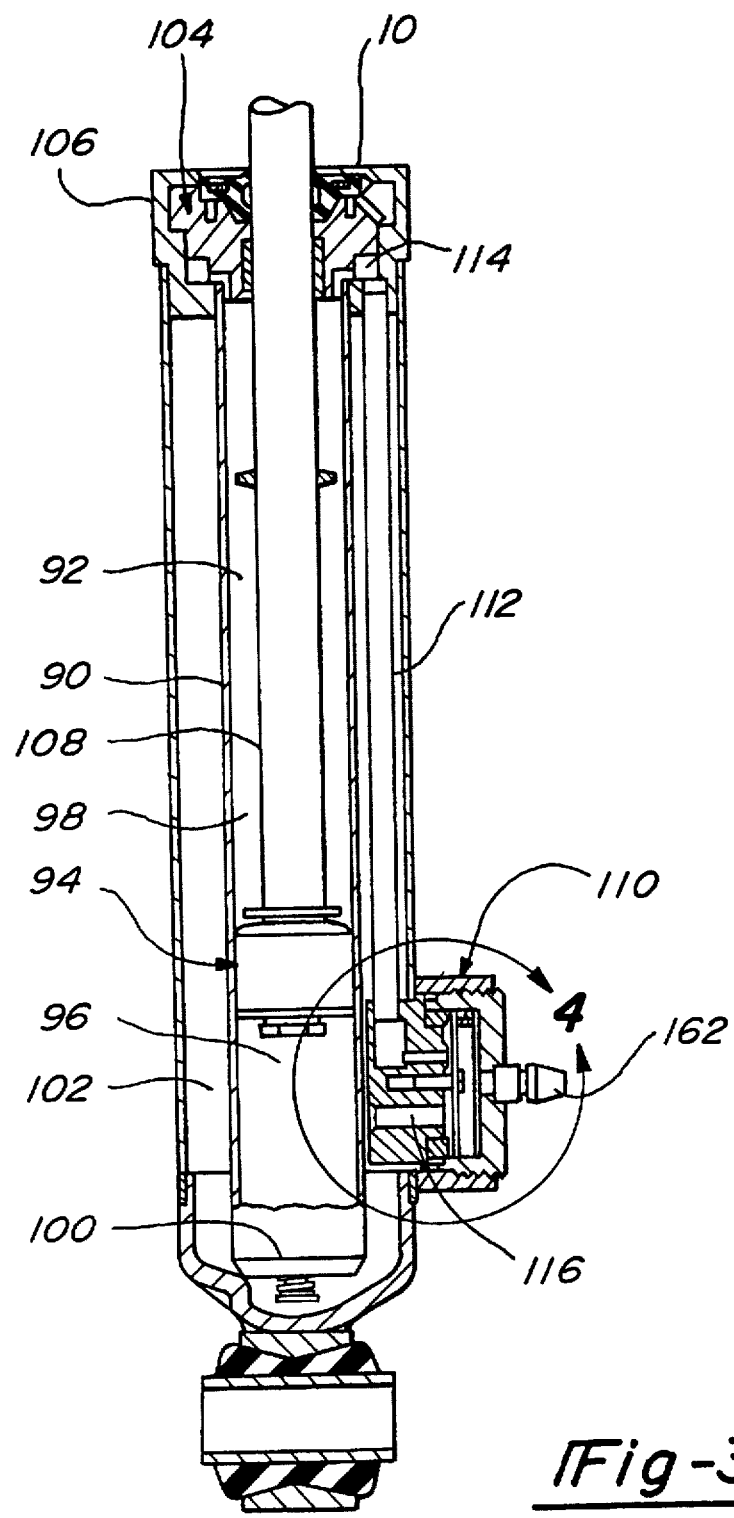
FIG. 3 is a longitudinal cross-sectional view of the shock absorber according to an exemplary preferred embodiment of the present invention.
Figure 4:
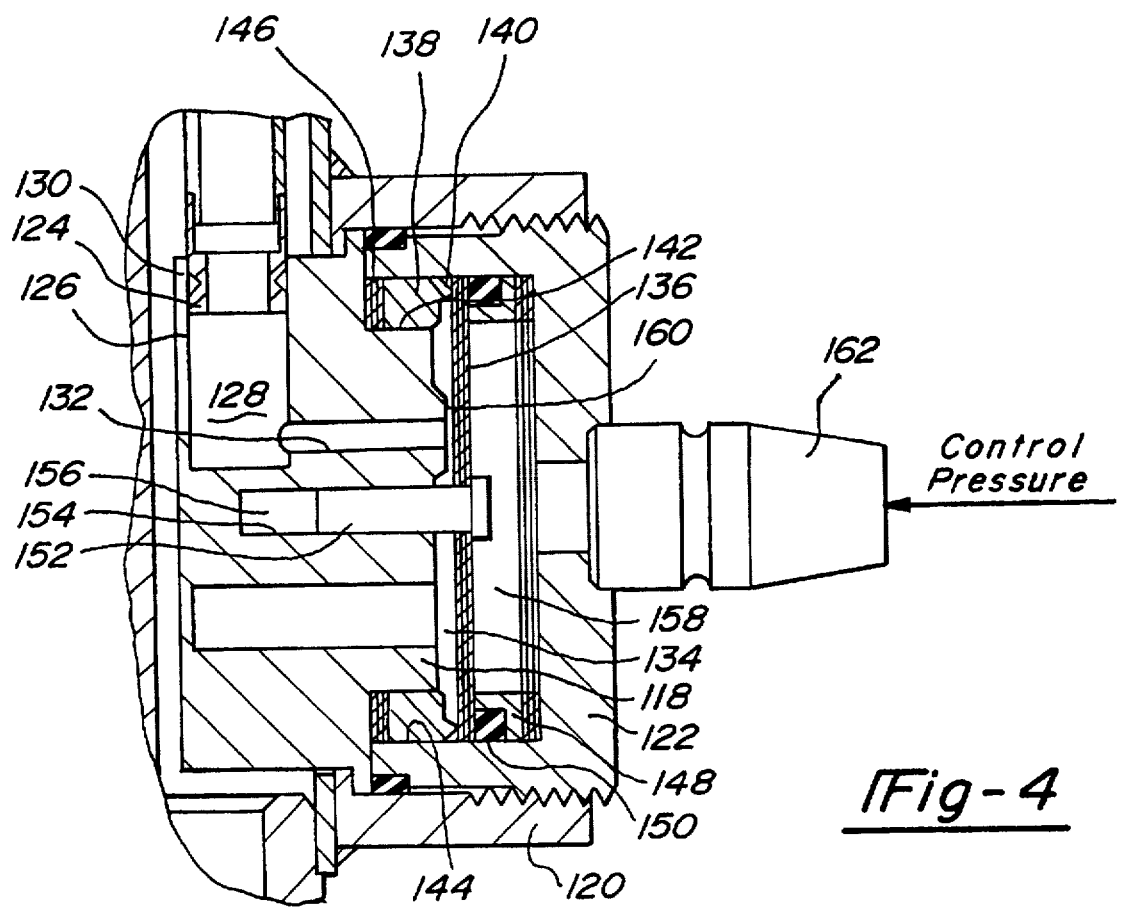
FIG. 4 is an enlarged view of the exemplary embodiment of the shock absorber of FIG. 3.

The operating fluid of lines 36, 40, 44, 72, and 76 is preferably air. Conversely, the operating fluid of the shock absorber 10 is preferably hydraulic fluid. This arrangement is possible by the provision of a shock absorber which responds to changes in air pressure. Accordingly, and with reference to FIGS. 3 and 4, the present invention incorporates a shock absorber 10 which comprises an elongated pressure tube cylinder 90 defining a damping fluid containing working chamber 92. A slidably moveable piston 94 divides the chamber 92 into and defines a lower working chamber 96 and an upper working chamber 98.

The shock absorber 10 further comprises a base valve 100 located within the lower end of the pressure cylinder 90 which permits the flow of damping fluid into the working chamber 92 from an annular fluid reservoir 102 during rebound. The base valve 100 also enables fluid flow into the annular fluid reservoir 102 during compression.

Referring to the upper end of shock absorber 10, a rod guide and seal assembly 104 seats within an upper end cap 106 of the pressure tube defining the reservoir 102. The rod guide and seal assembly 104 limits radial movement of an axially extending piston rod 108 and provides a fluid seal to prevent fluid from leaking from either the working chamber 92 or the reservoir 102 out of the shock absorber 10 during reciprocation of the piston rod 108. Further, the rod guide and seal assembly 104 seals the shock absorber 10 from the introduction of dirt, dust, or other contaminates into the fluidic portions of the shock absorber 10.

A valve assembly 110 fluidly communicates with the upper working chamber 98 through a tube 112 and a fluid passage 114 in the guide rod and seal assembly 104. The variable valve 110 also communicates with the fluid reservoir 102 directly via a fluid passage 116.

The variable valve assembly 110 includes a valve body 118, an outer valve housing 120, and an inner valve housing 122. The valve body 118 includes a number of fluid passages. As described above, the fluid tube 112 provides fluid passage between the upper working chamber 98 and the variable valve assembly 110. The fluid tube 112 engages a fitting 124 which is held in press-fitted engagement with an inner surface 126 of a pressure chamber 128. A fluid seal 130 prevents fluid leakage between the fluid chamber 128 and the fitting 124. The fluid tube 112 fluidly communicates with the fluid chamber 128 which in turn fluidly communicates with a fluid passage 132. The fluid passage 132 and the fluid passage 116 in turn fluidly communicate via a transfer chamber 134.

The transfer chamber 134 is defined as the volume between the valve body 118 and one or more flexible disks 136. The flexible disks 136 are secured via a disk clamping ring 138 and seat upon a raised projection 140 of the disk clamping ring 138. The disk clamping ring 138 is positioned between outer circumferential surface 142 of the valve body 118 and an inner circumferential surface 144 of the inner valve housing 122, thereby limiting radial movement of the clamping ring 138. The clamping ring 138 seats onto a ring seat 146.

On the other side of flexible disks 136 and opposite clamping ring 138, an undercut ring 148 having a seal 150 disposed within the undercut provides a clamping force upon the flexible disks 136. The inner valve housing 122, through threaded engagement with the outer valve housing 120, provides the axially compressing force on the ring 148. A rod 152 engages a longitudinal bore 154 formed in the valve body 118. The rod 152 engages the flexible disks 136 and reciprocates within the longitudinal bore 154 in the valve body 118. The rod 152 frictionally engages the central bore 154 and frictionally engages the flexible disks 136, thereby limiting their oscillation. The volume between the longitudinal bore 154 and the rod 152 defines a chamber 156.

The flexible disks 136 define a pilot chamber 158 between the flexible disks 136 and a portion of the inner valve housing 122. The flexible disks 136 interact with a land 160 formed in the valve body 118 to modulate fluid flow between the fluid passage 132 and the transfer chamber 134. That is, when flexible disks 136 flex in the direction of the valve body 118, fluid flow between fluid passage 132 and the fluid chamber 134 decreases due to the decrease in area between the land 160 and the flexible disks 136. Correspondingly, when the flexible disks 136 flex in a direction opposite the valve body 118, fluid flow between the fluid passage 132 and the transfer chamber 134 increases due to an increase in the area between the land 160 and the flexible disks 136. This interaction between the flexible disks 136 and the land 160 modulates the fluid flow between the fluid tube 112 and the fluid passage 116 of the variable valve 110. A control pressure from one of the lines 76 is provided at a control pressure inlet 162. The hydraulic control pressure provided at the pressure inlet 162 is transferred to the control chamber 158. The control pressure exerts a force on and translates into flexing of the flexible disks 136. An increase in control pressure results in an increased flexing in the flexible disks 136, and a corresponding decrease in control pressure results in reduced flexing of the flexible disks 136.

Figure 5:
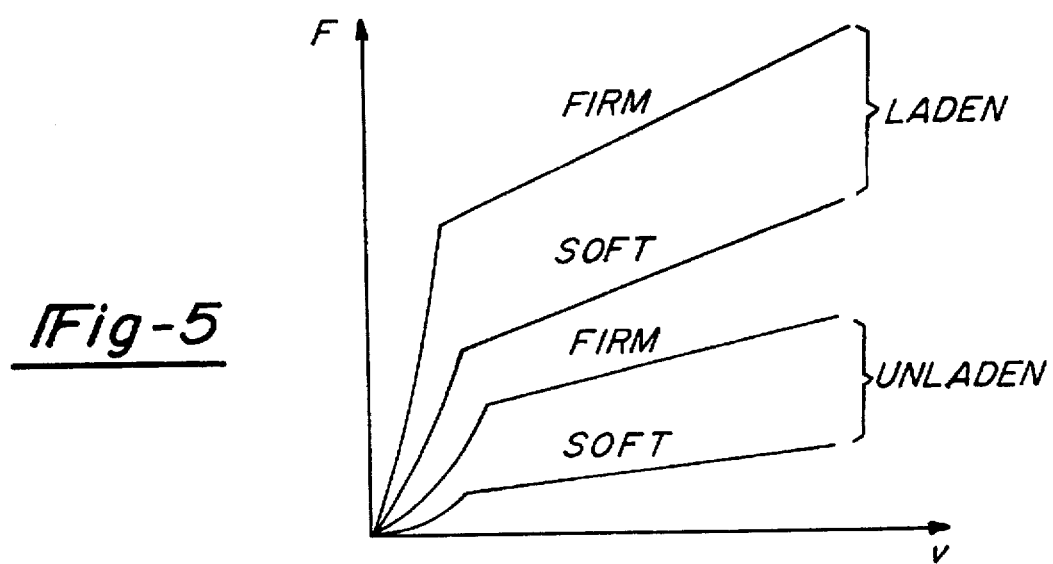
FIG. 5 is a graphical illustration of the variations of damping characteristics according to the adaptive load dependent suspension system of the present invention.

FIG. 5 illustrates a graph that demonstrates variances in damping characteristics based on the adaptive load dependent suspension system of the present invention. The damping force proportional to the fluid pressure is read along the Y-axis and velocity of the portion of the shock absorber connected to the vehicle chassis is read along the X-axis. The damping force is representative of the fluid (pilot) pressure because it is proportioned to such pressure.

In both the vehicle's laden and unladen states, the fluid pressure in the system for the firm ride is greater than the fluid pressure of the soft ride. However, and as illustrated, in its laden state, the fluid pressure when in the soft ride mode is greater than the fluid pressure in the firm ride mode when the vehicle is in its unladen state. In this manner, the adaptive load dependent suspension system of the present invention is universally and inherently responsive to both vehicle and road conditions.

From the preceding description of the preferred embodiments, it is evident that the objects of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. A suspension damping system for use with a vehicle having a chassis, the damping system including:
   a spring interconnecting an unsprung portion of the vehicle and the vehicle chassis, said spring having a fluid therein;
   a shock absorber interconnecting the unsprung portion and the vehicle chassis;
   a first pressure circuit for conveying said fluid at a first pressure between said spring and said shock absorber;
   a second pressure circuit for conveying said fluid at a second pressure between said spring and said shock absorber, said first and second pressures being different; and
   means for selectively and discretely restricting passage of fluid to that of said first pressure or to that of said second pressure.

2. The suspension damping system of claim 1, wherein said means for selectively and discretely restricting passage is a discrete control valve.

3. The suspension damping system of claim 2, wherein said discrete control valve includes a valve having a first pressure path and a second pressure path.

4. The suspension damping system of claim 3, further including a road condition sensor for directing said discrete control valve to move to one of said first pressure path or said second pressure path.

5. The suspension damping system of claim 1, further including a fluid junction and a spring pressure line interconnecting said spring and said fluid junction for conveying said fluid.

6. The suspension damping system of claim 1, further including a shock absorber pressure circuit connecting said shock absorber and a discrete control valve, said shock absorber pressure circuit conveying said fluid.

7. The suspension damping system of claim 1, wherein said second pressure circuit further includes a proportional pressure regulator.

8. The suspension damping system of claim 7, wherein said second pressure circuit further includes a high pressure regulator fitted between said proportional pressure regulator and a discrete control valve.

9. The suspension damping system of claim 8, wherein said second pressure circuit further includes a pressure reservoir fitted between said proportional pressure regulator and said high pressure regulator.

10. A suspension damping system for use with a vehicle having a chassis, the damping system including:
    a spring interconnecting an unsprung portion of the vehicle and the vehicle chassis, said spring having a fluid therein;
    a shock absorber interconnecting the unsprung portion and the vehicle chassis;
    a discrete control valve having a movable valve that defines a first pressure path and a second pressure path;
    a fluid junction;
    a spring pressure line interconnecting said spring and said fluid junction for conveying said fluid;
    a first pressure circuit interconnecting said junction and said discrete control valve, said first pressure circuit conveying said fluid at a first pressure;
    a second pressure circuit interconnecting said junction and said discrete control valve, said second pressure circuit conveying said fluid at a second pressure, said second pressure being lower than said first pressure; and
    a shock absorber pressure circuit connecting said shock absorber and said discrete control valve, said shock absorber pressure circuit conveying said fluid.

11. The suspension damping system of claim 10, further including a sensor connected to said discrete control valve for sensing road conditions.

12. The suspension damping system of claim 11, wherein said movable valve of said discrete control valve is operated by a solenoid.

13. The suspension damping system of claim 10, wherein said second pressure circuit further includes a proportional pressure regulator.

14. The suspension damping system of claim 13, wherein said second pressure circuit further includes a high pressure regulator fitted between said proportional pressure regulator and said discrete control valve.

15. The suspension damping system of claim 14, wherein said second pressure circuit further includes a pressure reservoir.

16. The suspension damping system of claim 15, wherein said pressure reservoir is fitted between said proportional pressure regulator and said high pressure regulator.

17. The suspension damping system of claim 10, wherein said fluid is air.

18. The suspension damping system of claim 10, wherein said spring being one of four springs interconnecting the unsprung portion and the vehicle chassis and said shock absorber being one of four shock absorbers interconnecting the unsprung portion and the vehicle chassis.

19. The suspension damping system of claim 10, wherein said shock absorber has a fluid therein.

20. The suspension damping system of claim 19, wherein said fluid in said shock absorber is different from said fluid in said spring.

21. A suspension damping system for use with a vehicle having a chassis, said damping system comprising:
    a spring interconnecting an unsprung portion of the vehicle and the vehicle chassis;
    a shock absorber interconnecting the unsprung portion and the vehicle chassis;
    means for delivering a fluid at a first pressure between said spring and said shock absorber;
    means for delivering said fluid at a second pressure between said spring and said shock absorber, said first and second pressures being different; and
    means for selecting between delivery of said fluid at said first pressure and at said second pressure.

22. The suspension damping system of claim 21, wherein said means for selecting is a discrete control valve having a movable valve that defines a first pressure path and a second pressure path.

23. A suspension damping system for use with a vehicle having a chassis, the damping system including:
- a spring connecting an unsprung portion of the vehicle and the vehicle chassis, said spring having a first fluid contained therein, said first fluid having a pressure, said pressure defining a control pressure;
- a shock absorber connecting the unsprung portion and the vehicle chassis, said shock absorber having a second fluid contained therein;
- a pressure circuit fluidly connecting said spring and said shock absorber for carrying said first fluid said pressure circuit operable to cause pressure changes in said first fluid; and
- means operatively connected with said shock absorber and connected to said pressure circuit for causing pressure changes in said first fluid to act on said second fluid.

24. The suspension damping system of claim 23, wherein said shock absorber further includes:
- a working chamber divided into upper and lower portions;
- a fluid reservoir for storing said second fluid;
- a valve body having an inlet and an outlet, the inlet fluidly communicating with said upper portion of said working chamber, the outlet fluidly communicating with said reservoir;
- a valve housing having an inlet, the inlet fluidly communicating with said first fluid; and
- wherein said means for causing pressure changes to act on said second fluid includes a flexible disk having a first side and a second side and disposed between said valve housing and said valve body, said disk defining on one side a controlling chamber defined by a volume between said one side and said valve housing and defining on the other side a transfer chamber defined by a volume between said other side and said valve body, said transfer chamber fluidly communicating with said inlet and said outlet of said valve body, an increase in said control pressure urging said disk toward said valve body and a decrease in said control pressure urging said disk away from said valve body.

25. The suspension damping system of claim 24, wherein said means for causing pressure changes to act on said second fluid further includes a land portion on said valve body in proximity to said flexible disk and defining a fluid passage in said transfer chamber.

26. The suspension damping system of claim 25, wherein said valve housing includes an inner housing and an outer housing, and a portion of said valve body is interposed therebetween, said inner and outer housings engaging said portion of said valve body.

27. The suspension damping system of claim 26, wherein said means for causing pressure changes to act on said second fluid further comprises:
- a first clamping ring having a raised projection defining a disk seat disposed between said valve body and said inner valve housing; and
- a second clamping ring disposed within an inner portion of said inner valve housing, said flexible disk being positioned between said first and second clamping rings, whereby engagement of said inner and outer valve housings clamp said flexible disk in a control valve.

28. The suspension damping system of claim 27, wherein said valve body is in communication with an outer surface of said fluid reservoir.

* * * * *